Patented Feb. 9, 1954

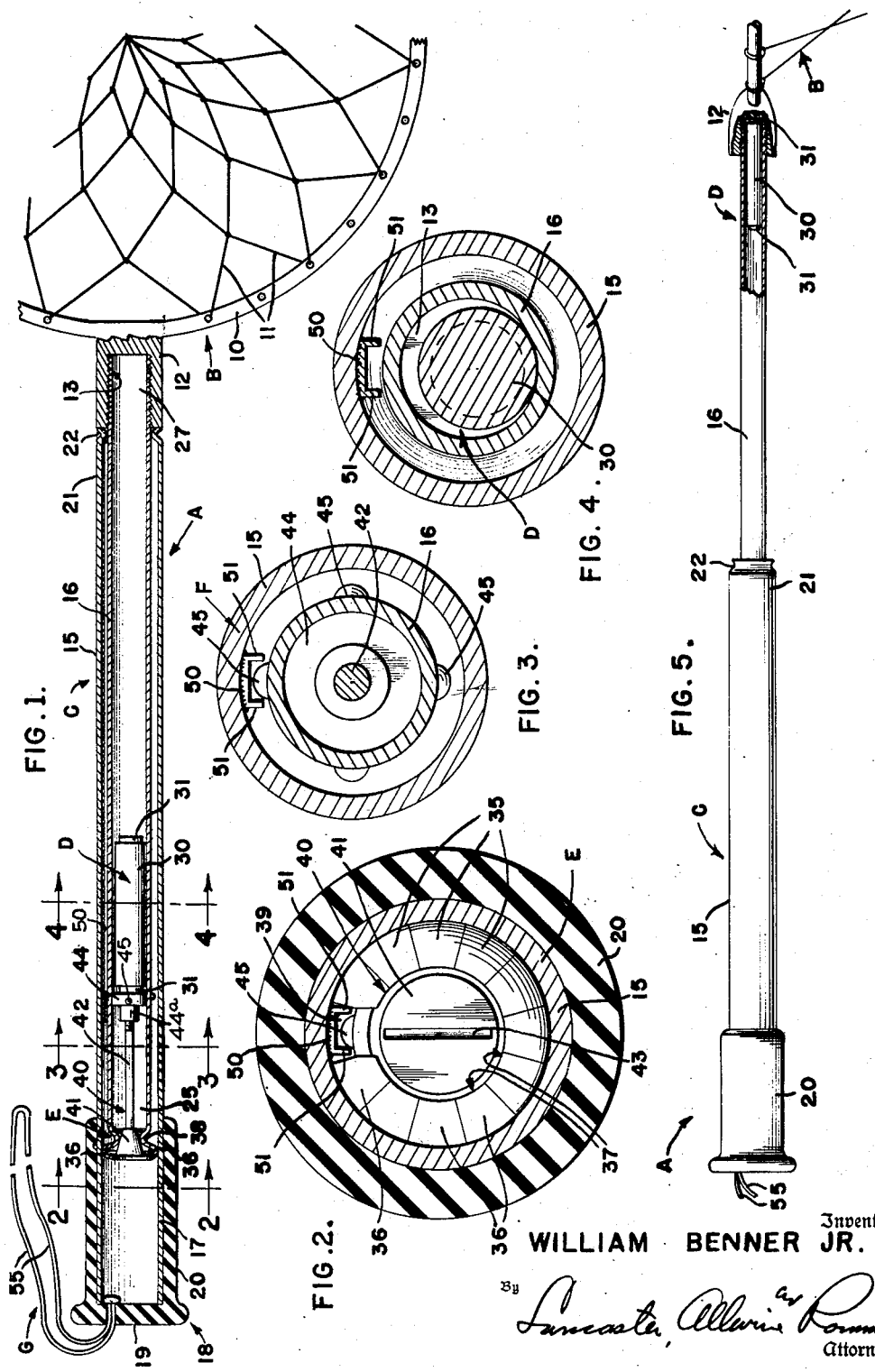

2,668,386

UNITED STATES PATENT OFFICE 2,668,386

EXTENSIBLE HANDLE FOR FISHING LANDING NETS

William Benner, Jr., Park City, Mont.

Application August 20, 1951, Serial No. 242,647

11 Claims. (Cl. 43—12)

This invention relates to extensible or telescopic handles for fish landing nets. Such nets may be employed, for example, in fishing.

An important object of the invention is to provide a telescope handle, which may be manipulated by one hand of the angler, for example, to retract or extend the handle. A long-handled conventional net is useless when the fish is swimming about the angler's boots, and a short-handled net of conventional construction is of no value when the fish is just a few inches out of reach.

Another important object is to provide a telescopic handle which may be fully manipulated by one hand to extend or retract it and which employs no springs, triggers, latches, cams or the like, but, instead, a simple weighted means for the purpose of extension and retraction of the handle.

Still another important object is to provide such means in association with adjustable means to retard or accelerate the action of the weighted means.

A further object of this invention is to provide a hollow telescopic handle for a net which handle is substantially water tight, is readily retracted to provide for easy transportation and storage, and is not expensive to manufacture.

Other objects and advantages of the invention will be apparent during the course of the following detailed description of the invention, when in connection with the accompanying drawing, forming a part of this disclosure, and in which drawing:

Fig. 1 is a longitudinal section of the new telescopic handled net, in a retracted position, with a fragment of the net portion in plan.

Figs. 2, 3 and 4 are transverse sections upon their respective lines 2—2, 3—3 and 4—4 in Fig. 1.

Fig. 5 is a view, mostly in elevation, of the new net, but in an extended position.

In the drawing, wherein for the purpose of illustration is shown a preferred embodiment of the invention and wherein similar reference characters designate corresponding parts throughout the several views, the new telescopic handled net is generally designated as A and comprises a net portion B, telescopic handle portion C comprising two interconnected sections, weighted means D for extension and retraction of the handle portion C, means E to selectively retard and accelerate movements of one of the sections when moved by the action of the means D, means F to prevent rotation of the two sections of the portion C, and means G for carrying the net and handle portions.

The net portion B is preferably of conventional construction and includes a frame or rim 10, supporting netting 11 and having an outwardly-projecting extension 12 which may have a screw-threaded socket 13 to detachably receive the outer free end screw-threaded part of one of the telescopic sections of the handle portion C.

There is shown a telescopic handle portion C made up of an outer elongated hollow section 15 and an inner elongated hollow section 16. Preferably the sections 15 and 16 are cylindrical tubes of suitable metal, as plated steel, and are imperforate.

The outer elongated hollow section 15 is preferably closed at its inner end part 17 by a socketed rubber grip 18, having an end wall 19 closing one end of the section 15 and a skirt 20 extending in good frictional contact with and along the part 17. The outer end part 21 may be crimped, to provide an inwardly projecting bead 22 for good frictional contact with parts of the inner section 16. It is necessary that the inner face or bore of the section 15 be smooth.

Unlike many telescopic sections, the section 16 does not contact the section 15 except at the bead 22, and at the springy or resilient inner end part 25 of the section 16, which constitutes a part of the means E. At least the inner face of the section 16 is substantially smooth and the outer end part 27 is preferably exteriorly screw-threaded for screw-threaded cooperation with the screw threads of the socket 13.

The weighted means D for extension and retraction of the handle portion C is preferably a heavy cylinder providing a weighted body 30, as of lead, having resilient means, as rubber bumpers 31 secured to its end faces, to project outwardly thereof and the body 30 is of a shape to freely slide along the inner face of the section 16.

As for the means E to selectively retard and accelerate movements of the section 16 when moved by the action of the means D, the former includes a plurality of substantially S-shaped tongues 35 in the inner end part 25 of the section 16, formed by longitudinally slitting this part from its outer end, and crimping the tongues 35 to provide outwardly-extending beading 36 next to the inturned free ends 37 of the tongues, and inwardly-extending beading 38 next to the beading 36. The tongues are resilient and normally spring toward the longitudinal axis of the section 16. It will be noted, in Fig. 2, that one tongue 35 is omitted, providing an opening or break 39, to accommodate a portion of the means F to be subsequently described.

Forming another part of the means E is a special screw 40, having a truncated conical head 41, providing a wedge, since the surface of the head slopes inwardly toward the screw-threaded shank 42 of the screw 40 and is adapted to bear against the inwardly-extending beading 38, forcing the tongues 35 outwardly with the beading 36 in selected degrees of frictional contact with the inner face of the adjacent part of the section 16. The head 41 may be provided with a suitable groove 43 in its end face so that the edge portion of a coin or the like may be inserted therein in order to manually rotate the screw 40 in either direction since the screw is retained, at its screw-threaded shank, by a member such as the disc 44 spaced inwardly of the end part 25 of the section 16 and secured to and within the section 16 as by conventional fasteners such as rivets with the heads 45 thereof extending outwardly of the periphery of the section 16 and one of them forming a part of the means F. The disc 44 has a screw-threaded collar 44ª with the opening therein to receive the screw-threaded shank 42. The disc 44 also functions as an abutment for the body 30 of the means D.

Means F to prevent rotation of the section 16 with respect to the section 15 (or vice versa) may be a channelled member 50 extending longitudinally of one section, such as the section 15, secured thereto to extend inwardly and with the channel thereof adapted to slidably receive one of the heads 45. The parallel walls 51 of the member 50 in cooperation with the head 45 which, as stated above, forms part of the means F, prevent rotation of either the section 15 or 16. These heads 45 have still a third function since, when the section 16 is fully extended, they will contact the bead 22 and prevent the section 16 from dropping from the section 15.

The opening or break 39 allows the channelled member 50 to pass the outwardly-extending beading 36 as may be appreciated in Fig. 2.

Any suitable means G may be provided for carrying the net A. This may be a cord 55 secured to the grip 18, such as at the end wall 19, and forming a carrying loop.

With the parts of the net A assembled as in Fig. 1, there is provided a very short-handled net adapted to land fish swimming near the fisherman. In order to extend the handle portion C, the fisherman need but whip the portion C slightly downwardly, whereupon the body 30 will slide forwardly and strike the bottom of the socket 13 causing the section 16 to slide longitudinally of the section 15 and thus extend the handle portion C, such as in Fig. 5. Of course the rapidity of this extension will depend upon a previous adjustment of the special screw 40 with respect to the beading 38. A little practice will soon acquaint the fisherman as to the degree of whip required in order to extend the handle portion C fully or to any other degree of extension. In order to retract the handle portion C, the fisherman raises the net-carrying end of the portion C above the grip-carrying end and the body 30 will slide rearwardly, strike the disc 44 and cause the section 16 to telescope.

Thus, it is now apparent that the entire manipulation of the new net A in landing fish, after the adjustment of the means E is made, is accomplished by one hand of the fisherman and depends upon bringing the handle portion C from one position to another, that is, from a position where the portion C is substantially horizontal to a position where the part 21 is lowermost, or to a position where the part 21 is uppermost.

Various changes may be made to the form of the invention herein shown and described without departing from the spirit of the invention or scope of the claims.

What is claimed is:

1. A landing net handle assembly including an outer hollow telescopic handle section and an inner hollow telescopic handle section, weight means to cause one of said sections to move longitudinally of the other section upon movements of said handle assembly from the horizontal towards the vertical, including a weighted body slidable longitudinally of said sections, and means to selectively retard and accelerate movements of said one of said sections when moved by said weight means.

2. A landing net handle assembly according to claim 1, characterized in that said means to selectively retard and accelerate movements of said one of said sections when moved by said weight means, is a friction means.

3. A landing net handle assembly according to claim 1, characterized in that said means to selectively retard and accelerate movements of said one of said sections when moved by said weight means, is a friction means and includes a resilient tongue carried by said inner handle section, and a wedge for moving said tongue into frictional engagement with the wall of said outer handle section and releasably retaining said tongue in such frictional engagement.

4. A landing net handle assembly according to claim 1, characterized in that said means to selectively retard and accelerate movements of said one of said sections when moved by said weight means, is a friction means and includes a resilient tongue carried by said inner handle section, and a wedge carried by said inner handle section for moving said tongue into frictional engagement with the wall of said outer handle section and releasably retaining said tongue in such frictional engagement.

5. A landing net handle assembly according to claim 1, characterized in that said means to selectively retard and accelerate movements of said one of said sections when moved by said weight means, is a friction means and includes a plurality of resilient tongues carried by said inner handle portion, each tongue being substantially S-shaped in longitudinal section to provide an outwardly-extending beading and an inwardly-extending beading, with said outwardly-extending beading in resilient contact with the inner face of said outer handle portion, a truncated conical wedge with its wedging face in frictional contact with said inwardly-extending beading, and means to manually move said wedge longitudinally of said handle portions to selectively cause said tongues to move toward and away from the longitudinal axes of said portions.

6. A landing net handle assembly according to claim 1, characterized in that said means to selectively retard and accelerate movements of said one of said sections when moved by said weight means, is a friction means and includes a plurality of resilient tongues carried by said inner handle portion, each tongue being substantially S-shaped in longitudinal section to provide an outwardly-extending beading and in inwardly-extending beading, with said outwardly-extending beading in resilient contact with the inner face of said outer handle portion, a truncated conical wedge with its wedging face in frictional contact with said inwardly-extending beading, a disc fixedly secured within and to said inner handle portion and provided with a screw-threaded opening and a screw-threaded shank carried by said wedge and with its screw threads cooperating with the screw threads of said disc.

7. A landing net handle assembly according to claim 1, characterized in that said means to selectively retard and accelerate movements of said one of said sections when moved by said weight means, is a friction means and includes a plurality of resilient tongues carried by said inner handle portion, each tongue being substantially S-shaped in longitudinal section to provide an outwardly-extending beading and an inwardly-extending beading, with said outwardly-extending beading in resilient contact with the inner face of said outer handle portion, a truncated conical wedge with its wedging face in frictional contact with said inwardly-extending beading, a disc fixedly secured within and to said inner handle portion and provided with a screw-threaded opening and a screw-threaded shank carried by said wedge and with its screw threads cooperating with the screw threads of said disc, said disc providing an abutment for said weighted body.

8. A landing net handle assembly including an outer hollow telescopic handle section and an inner hollow telescopic handle section, weight means to cause one of said sections to move longitudinally of the other section upon movements of said handle assembly from the horizontal towards the vertical, including a weighted body slidable longitudinally of said sections, means to selectively retard and accelerate movements of said one of said sections when moved by said weight means, and means to prevent rotation of said sections, one with respect to the other.

9. A landing net handle assembly according to claim 8 characterized in that said means to selectively retard and accelerate movements of said one of said sections when moved to said weight means includes a disc within said inner handle section and means to secure said disc to said inner handle section comprising a fastener provided with a head extending outwardly of said inner handle section, and said means to prevent rotation of said sections comprises a member secured to the inner face of said outer handle section and extending longitudinally thereof and having a straight, longitudinally extending channel slidably receiving said head.

10. A landing net handle assembly according to claim 8 characterized in that said means to selectively retard and accelerate movements of said one of said sections when moved to said weight means includes a plurality of resilient S-shaped tongues carried by said inner handle section, providing inner and outer beading, a wedge bearing against said inner beading, a shank carried by the wedge and having a screw-threaded free end portion, a disc within said inner handle section having a screw-threaded opening receiving the screw threads of said shank, and a fastener for securing said disc to said inner handle portion, said fastener having a head extending outwardly of said inner handle portion, and said means to prevent rotation of said sections comprises a member secured to the inner face of said outer handle section and extending longitudinally thereof and having a straight, longitudinally extending channel slidably receiving said head, said disc providing an abutment for said weight.

11. A landing net handle assembly according to claim 8 characterized in that said means to selectively retard and accelerate movements of said one of said sections when moved to said weight means includes a plurality of resilient S-shaped tongues carried by said inner handle section, providing inner and outer beading, a wedge bearing against said inner beading, a shank carried by the wedge and having a screw-threaded free end portion, a disc within said inner handle section having a screw-threaded opening receiving the screw threads of said shank, and a fastener for securing said disc to said inner handle portion, said fastener having a head extending outwardly of said inner handle portion, and said means to prevent rotation of said sections comprises a member secured to the inner face of said outer handle section and extending longitudinally thereof and having a straight, longitudinally extending channel slidably receiving said head, said disc providing an abutment for said weight, there being a space between two adjacent tongues of a width greater than the width of said member, said two adjacent tongues being disposed to either side of said member and outwardly of the planes of the longitudinal faces of said member.

WILLIAM BENNER, Jr.

References Cited in the file of this patent

UNITED STATES PATENTS

| Number | Name | Date |
|---|---|---|
| 686,280 | Gaudin | Nov. 12, 1901 |
| 1,107,075 | Karges | Aug. 11, 1914 |
| 1,699,276 | Boye | Jan. 15, 1929 |
| 1,921,323 | Purdon | Aug. 8, 1933 |
| 1,921,596 | Waiter | Aug. 8, 1933 |